US012711246B2

(12) United States Patent
Mcneely et al.

(10) Patent No.: US 12,711,246 B2
(45) Date of Patent: Aug. 18, 2026

(54) AI-DRIVEN AUTONOMOUS COMMAND FILTERING

(71) Applicant: DELINEA INC., San Francisco, CA (US)

(72) Inventors: David Mcneely, San Jose, CA (US); Noah Haibach, Frankfurt am Main (DE)

(73) Assignee: DELINEA INC., San Francisco, CA (US)

( * ) Notice: Subject to any disclaimer, the term of this patent is extended or adjusted under 35 U.S.C. 154(b) by 61 days.

(21) Appl. No.: 18/921,759

(22) Filed: Oct. 21, 2024

(65) Prior Publication Data

US 2025/0131101 A1 Apr. 24, 2025

Related U.S. Application Data

(60) Provisional application No. 63/592,036, filed on Oct. 20, 2023.

(51) Int. Cl.
*G06F 21/57* (2013.01)
*G06N 5/04* (2023.01)

(52) U.S. Cl.
CPC ............. *G06F 21/577* (2013.01); *G06N 5/04* (2013.01); *G06F 2221/034* (2013.01)

(58) Field of Classification Search
None
See application file for complete search history.

(56) References Cited

U.S. PATENT DOCUMENTS 10,318,730 B2 * 6/2019 Treadwell ............... G06F 21/52
12,423,445 B1 * 9/2025 Gupta .................. G06F 21/606
2022/0156361 A1 * 5/2022 Talmat ................ G06F 9/45512

* cited by examiner

*Primary Examiner* — Fatoumata Traore
(74) *Attorney, Agent, or Firm* — WOMBLE BOND DICKINSON (US) LLP

(57) ABSTRACT

A method and system to enable autonomous processing of a command line string prevent risky operations. After receiving a command, a session control service and holds the command in a queue while the command is parsed and risk analyzed. The parsed command and its parameters are sent to an AI-driven command risk analyzer trained on the types of commands that represent risks and generate a risk score. The risk score is used to inform the session control service to allow the command to be presented to the asset for execution if the risk has a low score and if the risk has a high score, either a) block the command execution or b) send the command and risk analysis to an admin user or approval team for review and either approval or rejection of the command.

16 Claims, 1 Drawing Sheet

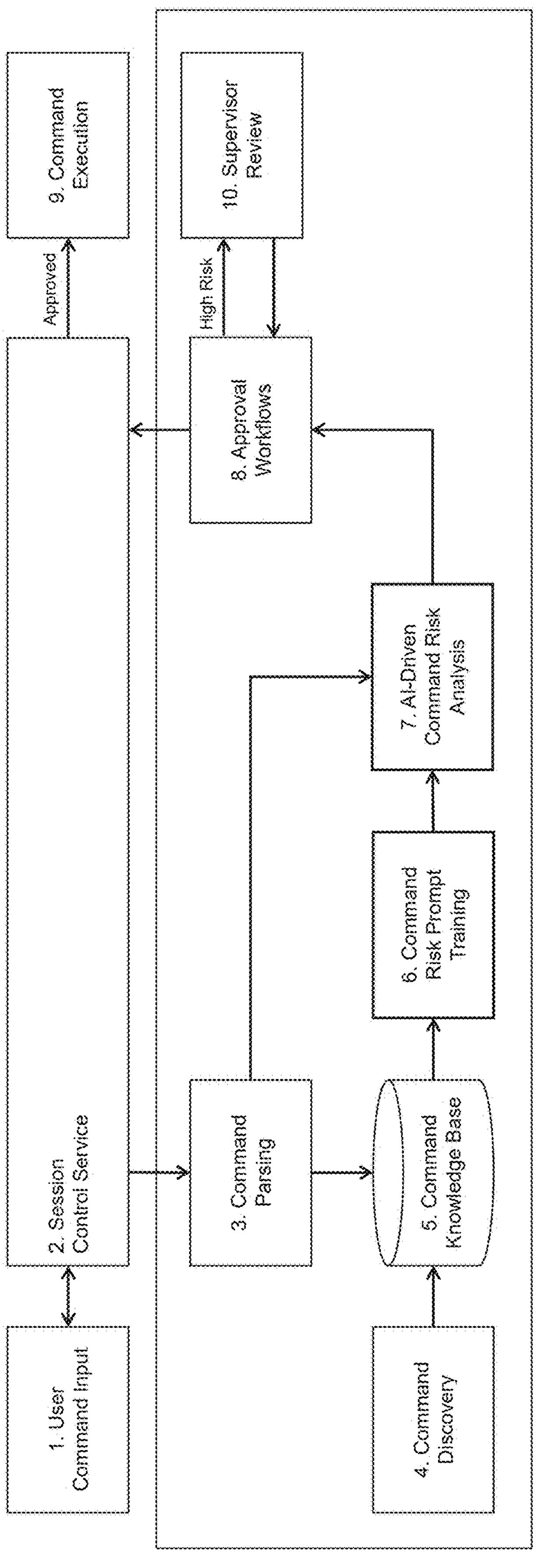
1. User Command Input
2. Session Control Service
3. Command Parsing
4. Command Discovery
5. Command Knowledge Base
6. Command Risk Prompt Training
7. AI-Driven Command Risk Analysis
8. Approval Workflows
High Risk
10. Supervisor Review
Approved
9. Command Execution

AI-DRIVEN AUTONOMOUS COMMAND FILTERING

BACKGROUND OF THE INVENTION

The terms "large language model" (LLM) and "Generative Pre-trained Transformer" (GPT) refer to different, albeit related, concepts within the domain of natural language processing (NLP) and machine learning.

Large Language Model (LLM) is a generic term for any language model that has a large number of parameters, typically in the billions or even trillions. LLMs are capable of understanding and generating human-like text. They are trained on vast amounts of text data to learn patterns in language.

Generative Pre-trained Transformer (GPT): This refers to a specific family of LLMs developed by OpenAI, an artificial intelligence research organization. GPT models are based on what is referred to as a Transformer architecture, which is particularly effective for handling sequential data like text. The "pre-trained" part implies that these models are initially trained on a large corpus of text, and can be fine-tuned for specific tasks later.

The adoption of a least privileged approach for the management of command or application execution on an asset is both a best practice and challenging for most organizations to adopt. The management of least privilege rights tends to be a human intensive process of determining the rights necessary for a given task in order to predefine those rights or enable the end user to request elevated privileges to run a command where a supervisor would make a risk-based determination and approve or reject that request.

While human oversight may be the gold standard for both creation of least privilege roles or policies as well as reviewing the riskiness of command requests, it is a limited resource. Further, even an experienced admin user can miss or incorrectly identify a high risk command or mistakenly identify what is a low risk command as high risk especially when presented with a high volume of commands.

SUMMARY OF THE INVENTION

A process known as autonomous privilege is a hybrid approach to providing dynamic privilege grants to an end user. The basis for the system is a Session Control Service (such as an SSH bastion server, restricted shell, admin desktop or process intercept) which inspects commands the user submits (before they have been run) and utilizes a GPT/LLM to identify high-risk commands. High risk commands are then displayed to a supervisor (human) along with the GPT/LLM risk analysis and is prompted to either approve or deny the command for execution.

In this manner, by simplifying least privileged command execution through AI-driven risk scoring it is possible to enable users to more seamlessly access assets (servers) with their personal privileged admin account and enable them to do anything they need (as if they have full admin rights) but without creating undue risks (blocking risky commands based on GPT/LLM analysis).

This solution monitors activity for anything the user should not do based on risk scoring (such as deleting everything) and providing appropriate guardrails (warning as to risk, supervisor approval, multi-factor challenge).

Thus, a method and system are disclosed to enable the autonomous processing of a command line string to determine the resulting risk of that command as a way to prevent risky operations without having to pre-define a least privilege set of rights.

BRIEF DESCRIPTION OF THE DRAWINGS

FIG. 1 is a block diagram overview of AI driven autonomous command filtering according to the invention.

DETAILED DESCRIPTION OF THE INVENTION

Referring to FIG. 1, User Command Input 1 is input a computer uses when making an SSH (secure shell protocol) command which can be any command to be executed on the asset after risk analysis is performed by the invention.

Session Control Service 2 can be any tool that is capable of intercepting and controlling execution of commands through either a Remote Access Gateway, privilege elevation control (sudo (super user do), run with privilege, restricted shell on Linux, or a virtual windows admin desktop environment). This service will hold the command in a queue while the command is sent to parsing and risk analysis which involves command parsing 3, command knowledge base 5, command risk prompt training 6 and AI driven command and risk analysis 7.

Command Parsing 3 interprets the command and the parameters from the data input stream, then sends the command itself to the command knowledge base 5 and sends the command along with its parameters to the AI-Driven Command Risk Analysis 7.

The command knowledge database uses command discovery 4 which discovers all executables, commands and applications that are installed on an asset and adds them to the command knowledge base 5.

The command knowledge database gathers information about commands, their parameters and the relative risk associated with the command based on its ability to either access sensitive information or to enable changes, updates or deletions of data.

Command risk prompt training is the AI based training on the types of commands that represent risks as well as specific commands or sequences of commands that are known to represent a risk to sensitive information.

AI-driven command risk analysis is an AI model such as a ChatGPT based AI which analyzes the command and its parameters based on the training to determine a risk score from low risk to high risk.

Approval workflows 8 is a service which takes the risk scoring and if the risk is low, it informs the session control service 2 to allow the command to be presented to the asset for execution 9. If the risk is determined to be a high risk, then based on a policy configuration the solution may either a) block the command execution by informing the Session Control Service 2 to prevent the execution and present an appropriate error message to the user or b) send the command and risk analysis to the user's supervisor or an admin user or approval team 10 for review and either approval or rejection.

Command execution 9 is a session control service that sends the command for execution if the risk is low or if the supervisor has approved the command for execution.

When a pending SSH command is flagged as potentially risky by the AI, the session control server 2 pauses execution of that command while it communicates with the admin user via an Admin UI which is part of supervisor review 10. A small SSH GUI tells the admin user the risk command as well as the reason it was flagged (provided by the AI). This happens within a live monitor (replay) SSH shell in the Admin UI. There the admin user has two buttons, to approve or deny. If the admin user selects deny, the session control server discards the pending SSH command and notifies the end user. If the admin user selects "Approve" the pending SSH command is released to the SSH target server to be run as normal.

This approach offers advantages over existing systems in the following ways:

As noted above, human oversight may be the gold standard for reviewing the riskiness of commands, but it is a limited resource. It is most efficient to identify only the risky potential commands and flag them for human review. Further, humans do not have the same reaction time as an AI-based system, meaning it is not feasible to have a human admin user review every potential SSH command before it is run due to the frequency and time sensitive nature of the usage of access management solutions.

The invention analyzes commands before they are run, whereas prior art systems, at best, only analyze the command after the fact. This provides an increase in the security posture of this AI-based command filtering approach.

The hybrid approach means that commands flagged by the AI are subsequently reviewed by a human, which allows for overriding the AI's analysis and allowing the command. This leads to fewer false positives and a lower burden to the efficiency of end users.

In alternate embodiments, the invention can also provide for:

- storage of all flagged commands and prompt engineering to decrease false positives (flagged commands that should not be flagged for review) which decreases the workload of the admin reviewer;
- on-screen (SSH GUI-based) messaging between the end user and the admin user, in order to validate additional context from the end user before approving a flagged SSH command, without leaving the Admin UI portal;
- an extension of capabilities to other remote access protocols in addition to SSH (such as via Guacamole protocol) or to other session control points;
- end-user specific risk models utilizing additional metadata from the specific session to contribute a baseline risk level to the dynamic risk prediction for an individual command.

The following steps can be taken to achieve this functionality:

An open-source implementation of a bastion server such as https://github.com/iamacarpet/ssh-bastion is extended. The end user connects to the bastion server from an SSH shell and selects a remote SSH target server to be proxied. The standard-in is forked and commands are split based on newline execution characters. These potential SSH commands are forwarded to an OpenAI LLM using prompts around finding risky SSH commands.

If a command is not found to be risky it is released downstream to the target server If a command is found to be risky, it is paused, the end user is notified, and waits while a request for admin response is sent to the Admin UI via, in an embodiment, SignalR which is a library for ASP.NET developers that simplifies the process of adding real-time web functionality to applications.

When the bastion server receives a reply from the Admin UI, it either releases the command to the target server (approval) or discards the command and notifies the end user of that fact (deny).

The bastion server also splits the stdout stream and forwards all output to an Admin UI client written in react. The bastion server records all sessions in ttyrec format and exposes all these recorded sessions to the Admin UI via an API endpoint.

An Admin UI portal is created in React.js.

Any recorded sessions are shown in a grid.

When a new session is started, it is added to the grid (SSH stdout is received via SignalR).

Within a live session, a risky command will prompt the admin user to click "approve" or "deny" within the virtual replay SSH shell.

The flow and block diagram provided in the FIGURE are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram.

Moreover, not all acts illustrated in a methodology may be required for a novel implementation.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

We claim:

1. A method to enable autonomous processing of a command line string prevent risky operations without having to pre-define a least privilege set of rights comprising:

- receiving a command from a user;
- intercepting and controlling execution of commands by a session control service and holding the commands in a queue while each command is being parsed and risk analyzed;
- parsing each said command and its parameters from a data input stream;
- sending the parsed command to a command knowledge base;
- sending the parsed command and its parameters to an AI-driven command risk analyzer;
- wherein the command knowledge database uses command discovery for discovering all executables, commands and applications that are installed on an asset and adds them to the command knowledge base, the command knowledge database gathering information about commands, their parameters and relative risk associated with the command based on its ability to either access sensitive information or to enable changes, updates or deletions of data;
- wherein the AI driven command risk analyzer is trained on the types of commands that represent risks and specific commands or sequences of commands that are known to represent a risk to sensitive information and generate a risk score;

using the risk score to inform the session control service to allow the command to be presented to the asset for execution if the risk has a low score and if the risk has a high score, either a) block the command execution by informing the session control service to prevent the execution and present an appropriate error message to the user or b) send the command and risk analysis to an admin user or approval team for review and either approval or rejection of the command.

2. The method defined by claim 1 further comprising on-screen messaging between the user and the admin user within an admin user interface portal.

3. The method defined by claim 1 further comprising using prompt engineering to decrease false positives.

4. The method defined by claim 1 wherein said user command is a secure shell protocol (SSH) command.

5. The method defined by claim 1 further comprising using a graphics user interface (GUI) to inform the admin user when a command is flagged as risky and providing the reason the command was flagged.

6. The method defined by claim 5 wherein the GUI presents the admin user with select and deny buttons to approve or deny the command.

7. The method defined by claim 6 wherein if the admin user selects the deny button, the session control service discards the command and notifies the user.

8. The method defined by claim 6 wherein if the admin user selects the approve button, the command is released to the asset to be run as normal.

9. A system to enable autonomous processing of a command line string prevent risky operations without having to pre-define a least privilege set of rights comprising:

a session control service configured to receive commands from a user and control execution of the commands by holding the commands in a queue while the command is being parsed and risk analyzed;

a command parser coupled to the session control service configured to parse the command and its parameters from a data input stream from said session control service;

a command knowledge base coupled to said command parser configured to discover all executables, commands and applications that are installed on an asset and add them to the command knowledge base, the command knowledge database gathering information about commands, their parameters and relative risk associated with the command based on its ability to either access sensitive information or to enable changes, updates or deletions of data;

an AI-driven command risk analyzer coupled to said command parser and said command knowledge database trained on types of commands that represent risks and specific commands or sequences of commands that are known to represent a risk to sensitive information and generate a risk score;

an approval workflow coupled to said AI-driven command risk analyzer and said session control service and inform said session control service to allow the command to be presented to the asset for execution if the risk has a low score and if the risk has a high score, either a) block the command execution by informing the session control service to prevent the execution and present an appropriate error message to the user or b) send the command and risk analysis to an admin user or approval team for review and either approval or rejection of the command.

10. The system defined by claim 9 further comprising on-screen messaging between the user and the admin user within an admin user interface portal.

11. The system defined by claim 9 further comprising using prompt engineering to decrease false positives.

12. The system defined by claim 9 wherein said user command is a secure shell protocol (SSH) command.

13. The system defined by claim 9 further comprising a graphics user interface (GUI) to inform the admin user when a command is flagged as risky and providing the reason the command was flagged.

14. The system defined by claim 13 wherein the GUI presents the admin user with select and deny buttons to approve or deny the command.

15. The system defined by claim 13 wherein if the admin user selects the deny button, the session control service discards the command and notifies the user.

16. The system defined by claim 13 wherein if the admin user selects the approve button, the session control service releases the command to the asset to be run as normal.

* * * * *